(12) United States Patent
Ellison et al.

(10) Patent No.: US 9,026,620 B2
(45) Date of Patent: *May 5, 2015

(54) CENTRALLY MANAGING AND MONITORING OF CLOUD COMPUTING SERVICES

(75) Inventors: Brian Lee Ellison, Orange Park, FL (US); Elizabeth Nord Pierce, Jacksonville, FL (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,271

(22) Filed: Aug. 6, 2012

(65) Prior Publication Data

US 2012/0296977 A1 Nov. 22, 2012

Related U.S. Application Data

(63) Continuation of application No. 12/750,894, filed on Mar. 31, 2010, now Pat. No. 8,271,615.

(60) Provisional application No. 61/202,738, filed on Mar. 31, 2009.

(51) Int. Cl.
*G06F 15/16* (2006.01)
*H04L 12/24* (2006.01)

(52) U.S. Cl.
CPC .................................. *H04L 41/0233* (2013.01)

(58) Field of Classification Search
USPC ........................... 709/217–219; 370/241–389
See application file for complete search history.

(56) References Cited

U.S. PATENT DOCUMENTS

| | | | |
|---|---|---|---|
| 7,072,934 B2 | 7/2006 | Helgeson et al. | |
| 7,213,058 B1 * | 5/2007 | Torres et al. ................... | 709/219 |
| 7,363,370 B2 * | 4/2008 | Collazo ......................... | 709/224 |
| 7,506,045 B1 * | 3/2009 | Christensen et al. ......... | 709/224 |
| 7,596,620 B1 | 9/2009 | Colton et al. | |
| 7,623,548 B2 | 11/2009 | Gilmartin | |
| 7,640,264 B1 | 12/2009 | Chaulk et al. | |
| 7,721,303 B2 | 5/2010 | Alves de Moura et al. | |
| 7,788,681 B1 | 8/2010 | O'Connell | |
| 8,180,849 B2 | 5/2012 | Viegener et al. | |
| 8,621,553 B2 | 12/2013 | Syed et al. | |
| 2002/0184312 A1 * | 12/2002 | Chen et al. ..................... | 709/205 |
| 2003/0033378 A1 * | 2/2003 | Needham et al. .............. | 709/218 |
| 2003/0038834 A1 * | 2/2003 | Wen et al. ...................... | 345/738 |
| 2003/0061404 A1 | 3/2003 | Atwal et al. | |
| 2003/0065541 A1 | 4/2003 | Menninger | |
| 2003/0120753 A1 * | 6/2003 | Ebert ............................. | 709/219 |

(Continued)

OTHER PUBLICATIONS

Non-Final Rejection, U.S. Appl. No. 12/750,894, dated Dec. 29, 2011.

(Continued)

*Primary Examiner* — Razu Miah
(74) *Attorney, Agent, or Firm* — Volpe and Koenig, P.C.

(57) ABSTRACT

A computer system that monitors attributes related to cloud computing services is disclosed. A request may be received via a portal within a common connection and database framework. The computer system may generate an internet-based interface that is configured to provide access to the attributes. The computer system may process selection criteria for an object related to the cloud computing services within the internet-based interface to be monitored within the common connection and database framework.

15 Claims, 10 Drawing Sheets

(56) References Cited

U.S. PATENT DOCUMENTS

| | | | |
|---|---|---|---|
| 2003/0135543 A1* | 7/2003 | Kittredge et al. | 709/203 |
| 2004/0054717 A1 | 3/2004 | Aubry et al. | |
| 2005/0144022 A1 | 6/2005 | Evans | |
| 2005/0193222 A1* | 9/2005 | Greene | 713/201 |
| 2006/0015584 A1* | 1/2006 | Ocko et al. | 709/219 |
| 2006/0031485 A1* | 2/2006 | Veprinsky et al. | 709/224 |
| 2006/0080592 A1* | 4/2006 | Alves de Moura et al. | 715/501.1 |
| 2006/0165040 A1 | 7/2006 | Rathod et al. | |
| 2006/0230076 A1 | 10/2006 | Gounares et al. | |
| 2006/0291462 A1* | 12/2006 | Alex et al. | 370/389 |
| 2007/0086435 A1 | 4/2007 | Kaler | |
| 2007/0136418 A1* | 6/2007 | Wolfe | 709/203 |
| 2007/0226319 A1* | 9/2007 | Laszakovits | 709/218 |
| 2008/0275992 A1 | 11/2008 | Basty et al. | |
| 2008/0320081 A1 | 12/2008 | Shriver-Blake et al. | |
| 2009/0217352 A1* | 8/2009 | Shen et al. | 726/3 |
| 2009/0271498 A1* | 10/2009 | Cable | 709/219 |
| 2009/0287837 A1 | 11/2009 | Felsher | |
| 2009/0300169 A1 | 12/2009 | Sagar et al. | |
| 2010/0048170 A1 | 2/2010 | Jewsbury et al. | |
| 2010/0064033 A1 | 3/2010 | Travostino et al. | |
| 2010/0169497 A1 | 7/2010 | Klimentiev et al. | |
| 2010/0250712 A1* | 9/2010 | Ellison et al. | 709/219 |
| 2010/0250746 A1 | 9/2010 | Murase | |
| 2010/0271951 A1* | 10/2010 | Dujardin et al. | 370/241 |
| 2010/0325191 A1 | 12/2010 | Jung et al. | |
| 2011/0093941 A1* | 4/2011 | Liu et al. | 726/7 |
| 2011/0125498 A1 | 5/2011 | Pickering et al. | |
| 2012/0089704 A1 | 4/2012 | Trahan et al. | |

OTHER PUBLICATIONS

Notice of Allowance, U.S. Appl. No. 12/750,894, dated May 16, 2012.
Non-Final Rejection, U.S. Appl. No. 13/567,280, dated Sep. 28, 2012.
Final Rejection, U.S. Appl. No. 13/567,280, dated Jun. 28, 2013.
Notice of Allowance, U.S. Appl. No. 13/567,280, dated Dec. 18, 2014.

* cited by examiner

CENTRALLY MANAGING AND MONITORING OF CLOUD COMPUTING SERVICES

CROSS-REFERENCE TO RELATED APPLICATIONS

This application is a continuation of application Ser. No. 12/750,894, filed Mar. 31, 2010 now U.S. Pat. No. 8,271,615, which claims the benefit of U.S. provisional Application No. 61/202,738 entitled "Internet-Based Portal System, Method And Program For Supporting Operations Of Multiple Non-Integrated Internet-Hosted Services And Internal Services" filed on Mar. 31, 2009, the contents of which are fully incorporated herein by reference.

BACKGROUND OF THE INVENTION

1. Field of the Invention

The present invention generally relates to a multi-tenant software as a service (SaaS) application or cloud computing service that manages and monitors the use of other SaaS applications or cloud computing services via a centralized common connection and database framework.

2. Description of the Related Art

SaaS refers to a software application delivery model where a software vendor develops a web-native software application and hosts and operates the application for use by its customers over the Internet. SaaS applications are an increasingly popular model for providing software functionality as it is economical in terms of both cost and customer hardware resources. As SaaS applications and services become more readily available, it is evident that more corporate entities, in particular, will adopt these services as a replacement for on-premise solutions.

These SaaS services are also referred to as cloud computing services. These cloud computing services may relate to applications such as email, financial systems, accounting, bookkeeping and others. The challenge related to such cloud computing services is that they are offered by different entities spread across the Internet. Thus, as the availability of cloud computing services multiply, the administrative overhead needed to monitor and manage these services will also multiply. Thus, it is desirable to reduce the time and effort required for the administrative overhead needed to monitor and manage these SaaS applications or cloud computing services.

SUMMARY OF THE INVENTION

An embodiment of the invention is directed to a method for monitoring and managing the use of a plurality of SaaS applications or cloud computing services within a common connection and database framework.

The method includes receiving a request for monitoring and managing information and attributes related to the SaaS applications or cloud computing services, wherein the request is received via a single portal within the common connection and database framework. An Internet-based interface is then displayed, which is configured to display, select and access information and attributes related to the SaaS applications or cloud computing services.

Using the Internet-based interface, a selection of an object related to the SaaS applications or cloud computing services to be monitored and managed is received. When monitoring is performed on the selected object, the monitoring includes: selecting at least one item from a list of available items on which to perform a monitoring operation based on the object selected; selecting at least one SaaS application or cloud computing service from a list of available SaaS applications related to the object selected; selecting a type of report for reporting monitoring results; selecting a time period for performing monitoring, if the time period is necessary; and providing a monitoring result report.

On the other hand, when management is performed on the selected object, the management includes: selecting a management operation for the object selected; selecting at least one SaaS application or cloud computing service and at least one item from a list of available SaaS applications or cloud computing services and a list of available items related to the object selected; performing the management operation on the at least one item selected and for at least one SaaS application or cloud computing service selected; and storing a result of the management operation performed.

The monitoring and managing of the information and attributes can be performed for selected categories, objects, items and SaaS applications or cloud computing services displayed in the Internet-based interface via the single portal within the common connection and database framework.

The method also includes partitioning of the information and attributes available for display, selection and access via the Internet-based interface, wherein the partitioning is based on SaaS applications or cloud computing services registered to a user or corporate entity. For example, each user or corporate entity may have associated objects and object attributes related to SaaS applications or cloud computing services that can be accessed using a unique but common identification key. Such a key can be used to create logical partitions for each of the users or corporate entities.

An example of the monitoring operation includes reading, extracting, analyzing, correlating and reporting information, wherein the management operation includes, but is not limited to, reading, writing, modifying, deleting and copying. Additionally, the monitoring result may be provided via a textual or graphical representation. The objects include, but are not limited to, users, groups, policies, mailboxes and phones; and the items include subsets of the users, the groups, the policies, the mailboxes and the phones related the use of the SaaS applications or cloud computing services.

In an embodiment of the invention, a method for monitoring and managing SaaS applications or cloud computing services within a common connection and database framework provides a social networking infrastructure that allows sharing of information related to the plurality of SaaS applications or cloud computing services by connecting to the common connection and database framework. The information may include existing experiences with the use of an SaaS application or cloud computing service, or a rating of an SaaS application or cloud computing service. The information can be presented in a graphical format along with text comments related to the rating of the SaaS application or cloud computing service. Additionally, an embodiment of the invention includes providing an application exchange infrastructure that allows for the exchange of information related to the user-defined code submission interface with this application and SaaS applications or cloud computing services.

Another embodiment of the invention is directed to a program stored on a non-transitory computer-readable storage medium for monitoring and managing the use of the SaaS applications or cloud computing services within a common connection and database framework, the program causes a computer to perform the methods of the embodiments of the invention noted above.

An embodiment of the invention is directed a system for monitoring and managing the use SaaS applications or cloud computing services within a common connection and database framework. The system includes databases configured to store information and attributes related to the SaaS applications or cloud computing services, wherein the databases include an objects database, a methods database and a logs database.

Additionally, the system includes an Internet-based interface configured to display, select and access the information and attributes related to the SaaS applications or cloud computing services; and a first data access layer configured to establish data communications between the Internet-based interface and the databases based on a command received from the Internet-based interface, wherein the data communications includes, but is not limited to, retrieving and storing the information and attributes related to the SaaS applications or cloud computing services A push-pull data layer is configured to push data to and pull data from the SaaS applications or cloud computing services based on a command received via the Internet-based interface; and a second data access layer configured to established data communications between the push-pull data layer and the SaaS applications or cloud computing services based on a command received from the Internet-based interface.

The system also includes a first network interface configured to establish a connection to the Internet-based interface from a third-party apparatus via a public network; and a second network interface configured to establish a connection between the push-pull data layer and the SaaS applications or cloud computing services via the public network.

If desired, the system is configured to monitor and manage selected information and attributes of the SaaS applications or cloud computing services available within the Internet-based interface via a single portal to the system via the first network interface and the public network.

An embodiment of the invention is directed to an apparatus for monitoring and managing the use of SaaS applications or cloud computing services within a common connection and database framework. The apparatus includes: an Internet-based interface configured to display, select and access information and attributes related to the SaaS applications or cloud computing services; and a first data access layer configured to establish data communications between the apparatus and a plurality of databases based on a command received via the Internet-based interface, wherein the data communications including storing and retrieving the information and attributes stored in the plurality of databases.

The apparatus includes a push-pull data layer configured to push data to and pull data from the SaaS applications or cloud computing services based on a command received via the Internet-based interface; and a second data access layer configured to establish data communications between the apparatus and the SaaS applications or cloud computing services based on a command received from said push-pull data layer.

If desired, the apparatus is configured to monitor and manage selected information and attributes of the SaaS applications or cloud computing services available within the Internet-based interface via a single portal to the apparatus via the public network.

Additionally, in other embodiments of the invention, both the system and apparatus include a social networking infrastructure and an application exchange infrastructure that allows sharing of information related to the plurality of SaaS applications or cloud computing services by connecting to the common connection and database framework.

BRIEF DESCRIPTION OF THE DRAWINGS

In the drawings, like reference numbers generally indicate identical, functionally similar and/or structurally similar elements. Embodiments of the invention will be described with reference to the accompanying drawings, wherein.

Figure 1:
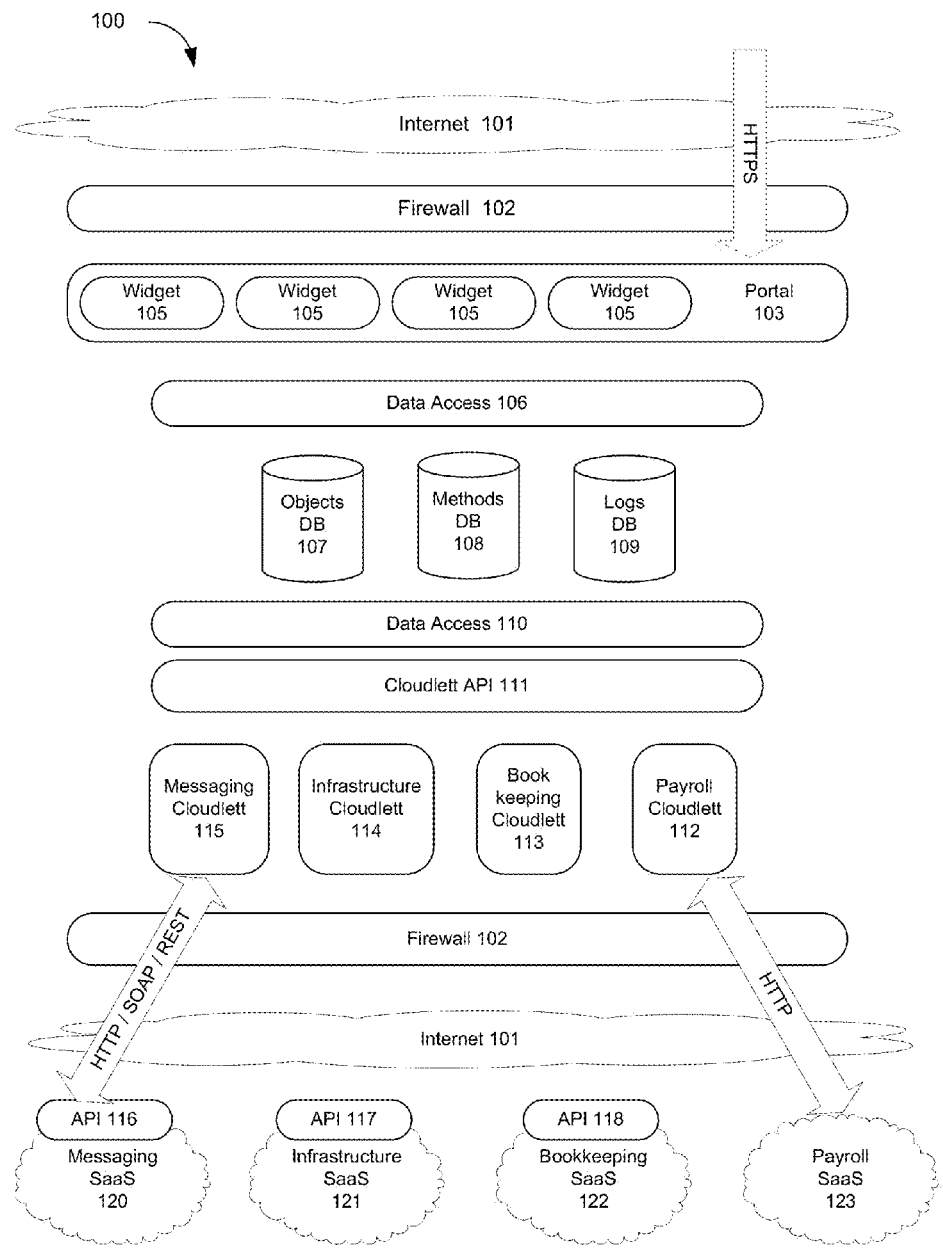
FIG. 1 illustrates a system for monitoring and managing the use of SaaS applications or cloud computing services in accordance with an embodiment of the invention.

Additional features are described herein, and will be apparent from the following description of the figures.

DETAILED DESCRIPTION OF THE INVENTION

In the description that follows, numerous details are set forth in order to provide a thorough understanding of the invention. It will be appreciated by those skilled in the art that variations of these specific details are possible while still achieving the results of the invention. Well-known elements and processing steps are generally not described in detail in order to avoid unnecessarily obscuring the description of the invention.

In the drawings accompanying the description that follows, often both reference numerals and legends (labels, text descriptions) may be used to identify elements. If legends are provided, they are intended merely as an aid to the reader, and should not in any way be interpreted as limiting.

FIG. 1 illustrates a system for monitoring and managing the use of SaaS applications or cloud computing services in accordance with an embodiment of the invention. The system is an Internet connected portal system that includes a security framework for connection to an Internet-based interface for providing, for example, access to databases for data storage and aggregation, object and object attribute management and monitoring capabilities, report and event correlation, and plug-in framework for controlling the administrative operations for multiple non-integrated Internet hosted SaaS services. A user will utilize this system by accessing the Internet-based interface as a single sign-in portal via a public network such as the Internet.

Starting from the top of FIG. 1, all external connections to and from the system 100 are performed over the public Internet 101. A firewall 102 provides standard encryption protocols used to secure communications to and from the system 100, and to and from the SaaS applications or cloud computing services 120-123 via the Internet 101. The firewall 102 may be a part of the system 100, but is preferably provided as part of a supporting infrastructure that provides protection the system 100 as a whole.

A user interface to the system 100 is provided as an Internet-based (e.g., front end) portal 103. The primary component of the portal 103 includes a dashboard that acts as a container for all other user interface elements or widgets 105 for initiated functions of the system 100. The widgets 105 are graphical elements that are linked and dependant on a push-pull data layer or user-defined code submissions 112-115 (hereafter referred to as "user-defined code submissions 112-115"). The user-defined code submissions 112-115 can be, for example, a PHP computer language that allows data communications within the framework of the system 100 via the dashboard of portal 103 and to the SaaS applications or cloud computing services 120-123 via the Internet 101. For example, the user-defined code submissions 112-115 allows the system 100 to push data to and pull data from the SaaS applications or cloud computing services 120-123 based on an activity initialed from the dashboard of the portal 103 or at periodic intervals. Additionally, the widgets 105 also contain links or shortcuts to other functions of the system 100 available through the portable 103.

The graphic elements or widgets 105 are not confined to a stationary location, but can be moved, docked, and undocked from the dashboard of the portal 103 by the user of the system 100. To this end, the dashboard of the portal 103 is dynamic in nature and can be customized.

A data access layer 106, 110 provides access to and from the databases 107, 108, 109. The databases include, but are not limited to, an objects database 107, a methods database 108 and a logs database 109. The object database 107 contains all tables, queries, stored procedures, and application code required to store, add, append, delete, modify, and execute all methods to objects and object attributes defined therein. All write and query operations against the object database are controlled and brokered via the data access layer 106. The data access layer 106 validates and secures all connections to and from the object database 107. The object and object attribute are configured and defined by the users of the system 100 so as to manipulate the corresponding SaaS and cloud computing objects and object attributes as defined and provided in the user-defined code submissions 112-115 related to the SaaS applications or cloud computing services 120-123. The user of the system 100 may be an individual user of the system 100 or preferably a corporate entity.

The objects and object attributes are stored in the object database 107 in a cross-tabular format to allow the system 100 to index and quickly query across all object and object attributes stored in the system 100. The system 100 can synchronize specific objects and object attributes and subsets of object attributes with external sources such as, but not limited to, LDAP, XML, CVS, TSV, and XLS as provided by the user of the system 100. Synchronization with these external sources is defined by the user and will be controlled, secured and normalized by the data access layer 106, 110. This synchronization can be performed in a single or bi-directional method.

The methods database 108 contains all tables, queries, stored procedures, and application code required to store, add, append, delete, modify, and execute all actions available to be performed against object and object attributes related to the SaaS applications or cloud computing services. Actions contained within this database 108 include but are not limited to add, delete, modify copy, clone, grow, and shrink operations. These actions stored in the database 108 are made available to the system framework, and the user-defined code submissions 112-115 via the data access layer 106, 110. All write and query operations against the methods database 108 are controlled and brokered via the data access layer 106. The data access layer 106, 111 validates and secures all connections to and from the methods database 108 and to and from the user-defined code submissions. The available methods set are configured and defined by a system administrator and the user of the system 100 to manipulate the corresponding object or object attributes related to an SaaS application or a cloud computing service defined and provided in the user-defined code submissions 112-115.

The logs database 109 contains all tables, queries, stored procedures, and application code required to store, add, append, delete, modify all activity, events, incidents, security, operational, performance, uptime, and other SaaS application or user specific information in the system 100. The system 100, using user-defined time intervals, remotely queries and records responses for performance and uptime into the logs database 109 via the data access layer 106. The uptime and performance queries are performed utilizing standard IP protocols such as ICMP types 8.0 and TCP 80 (HTTP). All responses and the time intervals between request and responses via the system 100 are recorded in sequence in the database 109 via the data access layer 106. The data contained within the database 109 is extracted via the data access layer 106 and presented to the user via textual and graphical representations, such as, tables, graphs, plots, trends, pivots, and other reports defined within the system 100.

The system 100 maintains a logical separation of data contained in the databases 109 to isolate the log data from other users. That is, the system 100 performs a partitioning of the information and attributes available for display, selection and access via the Internet-based interface, wherein the partitioning is based on SaaS applications or cloud computing services registered to a user or corporate entity. For example, each user or corporate entity company may have associated objects and object attributes related to SaaS applications or cloud computing services that can be accessed using a unique but common identification key for each user or corporate entity. Such a key can be used to create logical partitions for each of the users or corporate entities.

Operations performed by the user-defined code submissions 112-115 with respect to the system 100 are brokered and secured by the API (Application Programming Interface) 111 and all the code, logic, functions and parameters contained therein. Additionally, all requests by the system 100 to the SaaS applications or cloud computing services 120-123 are brokered and secured by the APIs 115-117 of the SaaS applications or cloud computing services and all the code, logic, functions, and parameters contained therein. The API contains all code, logic and methods that are made accessible to the user-defined code submissions 112-115 in order to access the framework and databases 107, 108, 109 and perform the primary functions of the system 100. Additionally, the data access layer 111 validates and secures all connections between the databases 107, 108, 109 and the API 115-117.

Additionally, the API 115-117 and all associated code, methods, and logic may not be used to perform the systems 100 secondary function. All operations performed on object or object attributes via the secondary function of the system 100 can automatically be processed and distributed via the plug-in framework to the various hosted SaaS application or cloud computing services 120-123. The plug-in framework will provide as the APIs. The plug-in frame work may be a community development of plug-ins that will work within the confines of the system framework. The objects and the state of these objects including all associated metadata will be stored in the databases 107, 108, 109 associated with the Internet connected portal 103.

Figure 2:
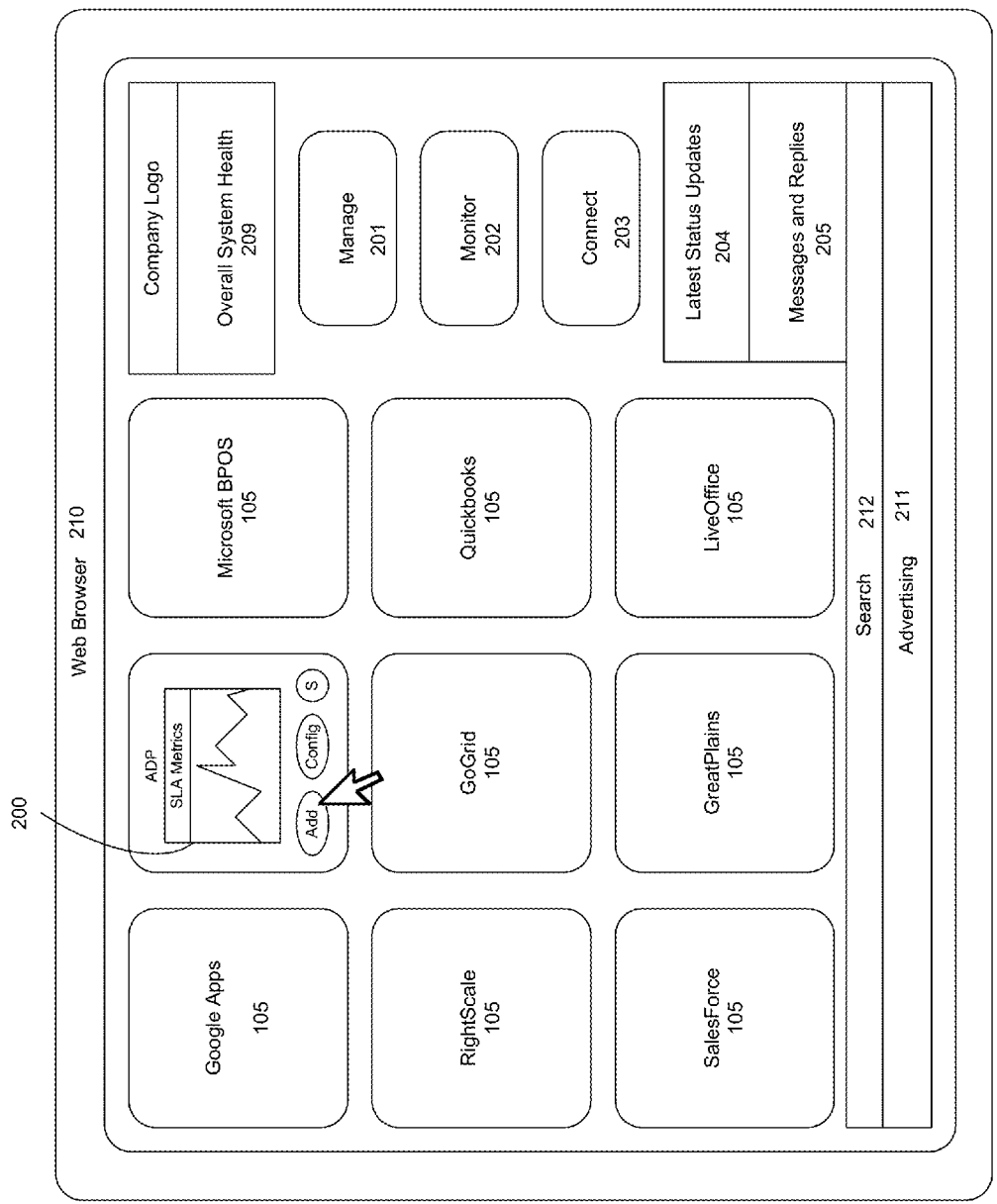
FIG. 2 illustrates an Internet-based interface for monitoring and managing the use of SaaS applications or cloud computing services in accordance with an embodiment of the invention.

FIG. 2 illustrates the Internet-based interface for monitoring and managing the use of SaaS applications or cloud computing services in accordance with an embodiment of the invention. The user Internet-based interface to the system 100 is provided as an Internet-based (e.g., front end) portal 103. As seen from FIG. 2, the portal 103 includes interface elements or widgets 105 for initiated functions of the system 100 related to SaaS applications or cloud computing services. The widgets 105 are graphical elements that are displayed to the user in a web browser 210 that acts as a dashboard (hereafter referred to as "dashboard 210"). The widgets 105 are linked to and dependant on the user-defined code submissions 112-115, and the user-defined code submissions 112-115 are related to SaaS applications or cloud computing services registered to users of the system 100. The widgets 105 also contain links and or shortcuts to other functions 200 of the system 100 available through the dashboard of the portal 103 allowing a user to jump into either the primary or secondary function provided by the system 100 from the dashboard 210.

The widgets 105 displayed in the dashboard 210 are dynamic in nature and can be customized to some extent by the user and based on the SaaS applications or cloud computing services registered to the user. The widgets 105 can interact with the system 100 and the system framework and display information related to SaaS applications or cloud computing services 120-123 associated with the widgets 105 using, for example, various graphical and textual formats.

As seen in FIG. 2, the dashboard 210 also includes graphical elements related to the primary and secondary functions of the system 100. For example, the two primary function of the system 100 can be initiated by selecting "monitor" and "manage" graphical elements 201, 202 of the dashboard 210. Additionally, the secondary function of the system 100 can be initiated by the selecting the "connect" and "search" graphical elements 203, 212 of the dashboard 210. The primary and secondary functions of the system 100 will be explained in more detail with reference to the figures that follow. The dashboard 210 also provides access to a social networking function "messages and replies" 205, which may be based on the use of SaaS applications or cloud computing services by users and may include access to feedback and ratings of an SaaS application or cloud computing service. The dashboard 210 also provides means for determining overall health of the system 209, latest status updates 204 and options related to advertising 211.

The dashboard 210 also contains design elements and functional elements such as buttons, fly-out menus, scrolling text and graphics, and input dialog boxes. Additionally, when a user interacts with one or many of the graphical elements displayed on the dashboard 210, and windows external to the dashboard are generated for more refined user input and interaction. The windows include, but are not limited, to buttons, text, graphics, input fields, drop down menus, single and multi select lists expand/contract lists, and combo boxes. The purpose of these windows is to collect more information from the users for performing the application's primary and secondary functions.

Graphical elements available for display to the user via the dashboard 210 are dependent on what user-defined code submissions 112-115 and related SaaS applications or cloud computing services are registered to the user of the system 100. The user-defined code submissions 112-115 registered or unregistered to a user populate or omit the options available to the user via the dashboard 210 of the portal 103. These options would include, but are not limited to objects, object attributes, methods, reports, and graphical interface elements related to SaaS applications or cloud computing services 120-123.

Figure 3:
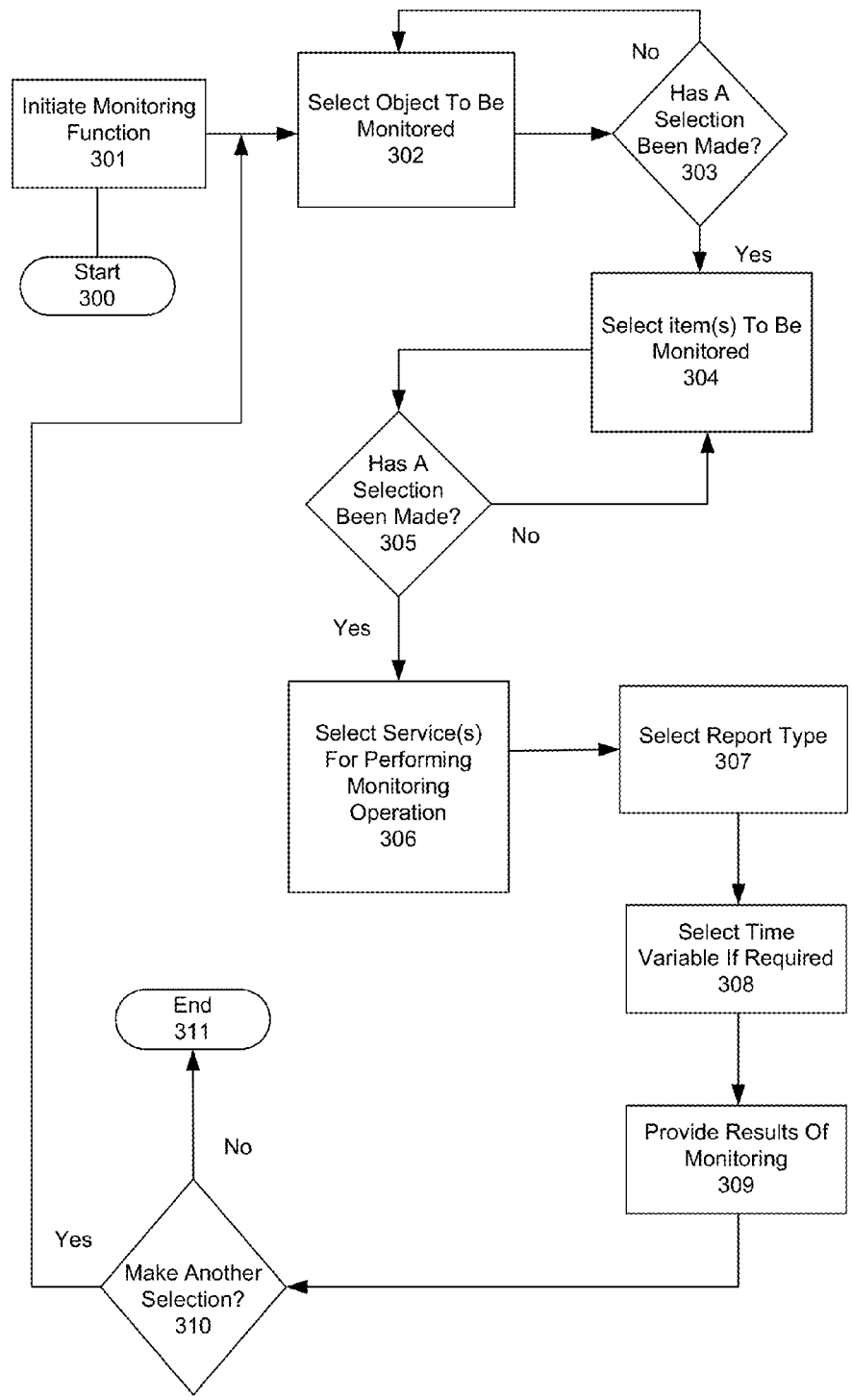
FIG. 3 illustrates a flowchart for performing a method of monitoring the use of SaaS applications or cloud computing services in accordance with an embodiment of the invention.

FIG. 3 illustrates a flowchart for performing a method of monitoring the use of SaaS applications or cloud computing services in accordance with an embodiment of the invention. The monitoring function illustrated in FIG. 3 is one of the two primary functions performed by the system 100. Generally, the monitoring function performed by the system 100 includes, but is not limited to, read, extract, analyze, correlate, and report, in either tabular or graphic representations of the data, on operational events, logs, incidents, performance, uptime, and other user specific operational metrics related to SaaS applications or cloud computing services.

In step 300, the monitoring process can be started by connecting to the system 100 and initiated in step 301 by the selection of a graphical element within the dashboard 210 such as "monitor" 202. The monitoring function may also be initiated by selecting an option within one of the other graphical elements (e.g. 200, 212) in the dashboard 210.

When the monitoring function is initiated in step 301, the user will be queried as to what object is to be monitored. That is, the user is presented with a list of objects that are available based on the user-defined code submissions 112-115 and SaaS applications or cloud computing services 120-123 registered to the user. The object listed may relate to but are not limited to user, group, policy, mailbox, phone or user defined plug-in for SaaS applications or cloud computing services. In step 302, an object is selected by the user via the dashboard 210. In step 303, it is determined if a selection has been completed, and if not, the system 100 will again send a query to the user regarding the selection of an object. In step 303, if it is determined that a selection has been completed, then the user is presented with a list of available items on which to perform a monitoring operation based on the object selected.

In step 304, the user selects an item or items for performing the monitoring operation based on object selected via the dashboard 210. In step 305, if it is determined whether a selection has been completed, and if not, then the user is again sent a query regarding the selection to be performed. In step 305, if it is determined if a selection is complete, then the user is presented with a list of associated SaaS applications or cloud computing services for which the monitoring operation of the items or items is to be performed. The list of associated SaaS applications or cloud computing services and items presented to the user is based on the user-defined code submissions 112-115 and SaaS applications or cloud computing services 120-123 registered to the user. Additionally, the SaaS applications or cloud computing services presented to the user depend on the object selected. For example, if the object selected is "mailbox" then only the SaaS applications or cloud computing services presented to the user for selection will relate to e-mail services. In step 306, the user makes a selection of the associated SaaS applications or cloud computing services and the items or items via the dashboard 210.

In step 307, the user selects a type or report for reporting the results of the monitoring being preformed for the SaaS applications or cloud computing services and item or items selected. The user selects the type or report via the dashboard 210, and it is preferred that only one type of report be selected at a time for reporting the monitoring results.

In step 308, the user selects a time variable for performing the monitoring, if needed. For example, a time variable may include but is not limited to a certain start time and end time for performing the monitoring. Additionally, not all reports of monitoring results will require a time variable. In step 309, the results of the monitoring are provided to the user. For example, the user can select an option within the dashboard 210 to generate a report for the monitoring being performed. The report can be run and displayed on a screen within the dashboard 210, and the user can print the requested report. In step, 310, the user determines if there is any other type of report, object, items or SaaS applications or cloud computing services for which monitoring results are needed. If so, the user can make another selection as in step 302. On the other hand, if no other monitoring results are needed, then the user can end the monitoring function performed by the system 100 in step 311.

Figure 4:
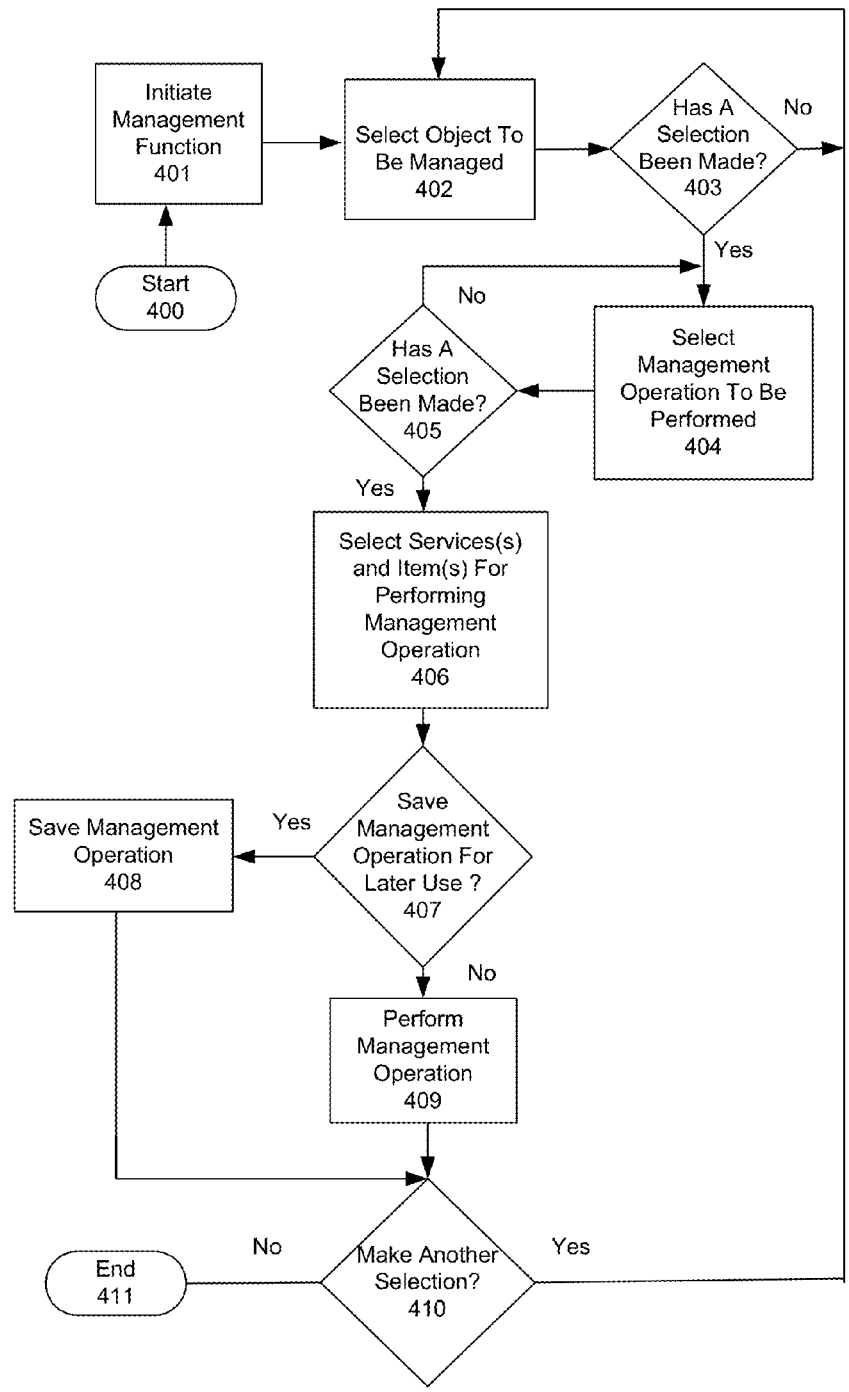
FIG. 4 illustrates a flowchart for performing a method of managing the use of a plurality of SaaS applications or cloud computing services in accordance with an embodiment of the invention.

FIG. 4 illustrates a flowchart for performing a method of managing the use of a plurality of SaaS applications or cloud computing services in accordance with an embodiment of the invention. The managing function illustrated in FIG. 4 is the second primary function performed by the system 100. Generally, the managing function performed by the system 100 includes, but is not limited to read, write, modify, delete, and subsets or variations of these actions, such as, clone or copy on or against user specific objects and object attributes related to SaaS applications or cloud computing services.

In step 400, the managing function can be started by establishing a connection to the system 100, and initiated in step 401 by the selection of a graphical element within the dashboard 210 such as "manage" 201. The managing function may also be initiated by selecting an option within one of the other graphical elements (e.g. 200, 212) in the dashboard 210.

When the managing function is initiated in step 401, the user will be queried as to what object is to be managed. That is, the user is presented with a list of objects that are available based on the user-defined code submissions 112-115 and SaaS applications or cloud computing services 120-123 registered to the user. The object listed may relate to but are not limited to user, group, policy, mailbox, phone or user defined plug-in for SaaS applications or cloud computing services. In step 402, a selection of an object is made via the dashboard 210. In 403, it is determined if a selection has been completed, and if not, the system 100 will again send a query to the user regarding the selection of an object.

In step 403, if it is determined that a selection has been completed, then in step 404 the user selects a management operation to be performed on the object selected. The management operations available to the user are based on the user-defined code submissions 112-115 and SaaS applications or cloud computing services 120-123 registered to the user, and the selection of a management operation to be performed is made via the dashboard 210. In step 405, it is determined if a selection of a management operation has been made, and if not, the user is again sent a query regarding the selection of a management operation.

In step 405, if it is determined that the selection of a management operation is complete, then the user is presented with a list of SaaS applications or cloud computing services and items on which to perform the selected management operation. The list of associated SaaS applications or cloud computing services and a list of items available for selection are based on the user-defined code submissions 112-115 and the SaaS applications or cloud computing services 120-123 register to the user. In step 406, the user makes a selection of an item or items and associated SaaS applications or cloud computing services on which to perform the management operation via the dashboard 210. The selection by the user may include a single selection or a selection of multiple items and associated SaaS applications or cloud computing services for performing the selected management operation. In step 407, it is determined if the user would like to save the selected management operation for later use, and if so in step 408 the management operation is saved in one of the databases 107, 108 and 109.

After saving the management operation in step 408, the user can choose to make another selection of an object, item(s) and SaaS application(s) or cloud computing service(s) on which to perform a management operation in step 410. Otherwise, if the user wishes to perform the selected management operation, then in step 409 the selected management operation is performed on the item or items and for the SaaS applications or cloud computing services selected. In step, 410, it is determined whether the user would like to make another selection of an object, item(s) and SaaS application(s) on which to perform a management operation. Otherwise, the user can decide to end the management function performed by the system 100 in step 411.

Figure 5:
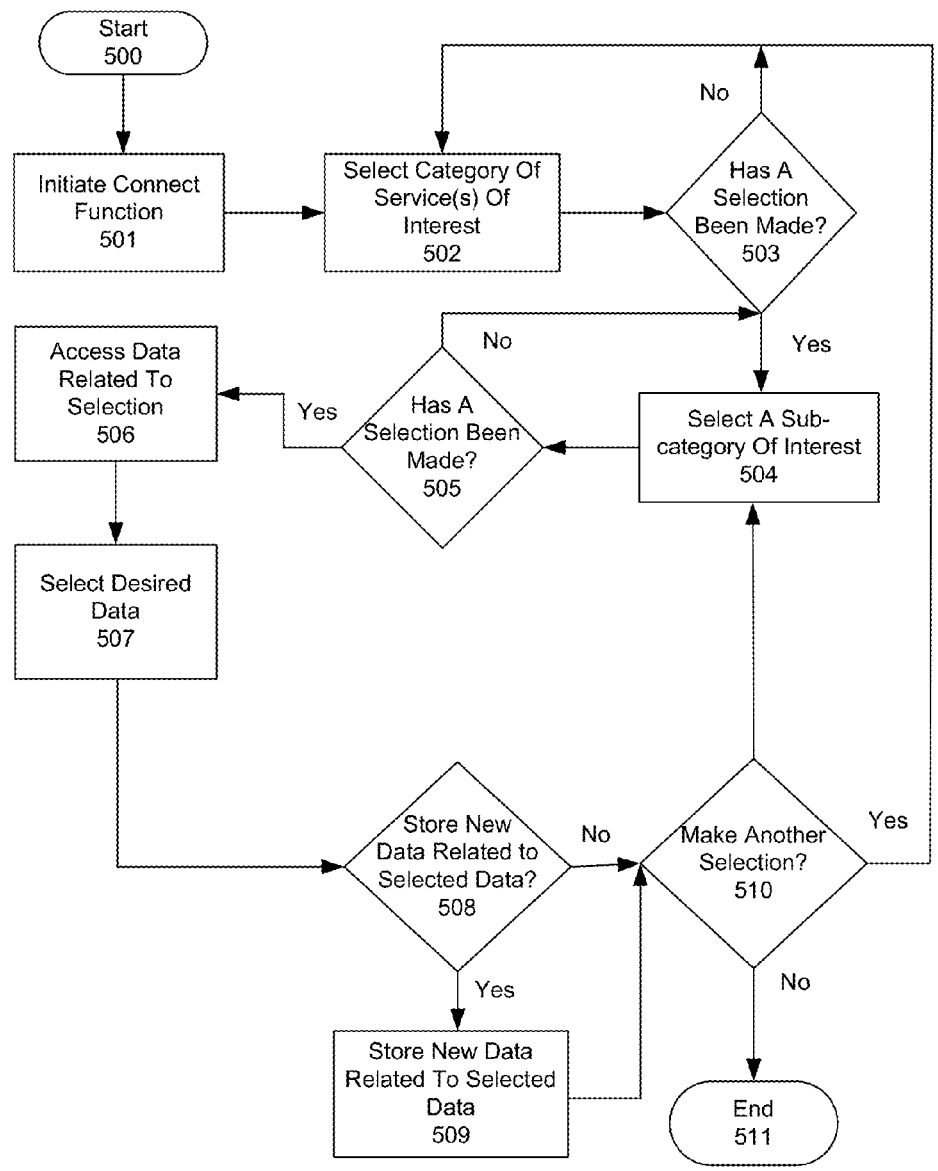
FIG. 5 illustrates a flowchart for performing the social network function related to the use of SaaS applications or cloud computing services in accordance with an embodiment of the invention.

FIG. 5 illustrates a flowchart for performing the social network function related to the use of SaaS applications or cloud computing services in accordance with an embodiment of the invention. The social networking infrastructure and framework offered by the system 100 allows users to share and expand on existing experiences with SaaS applications or cloud computing services. The social networking function includes a user contributed and maintained knowledge base with feedback and comment functionality, which includes various rating systems for SaaS applications or cloud computing services, and rating system for the applications user-defined code submissions.

Each SaaS application 120-123 and the related user defined code submissions 112-115 will belong to categories and one or more subcategories. These categories and sub-categories aid in the search and organization of the SaaS applications or cloud computing services and the related user-define code submissions within the social network and via the dashboard 210 of the portal 103. The social network allows a subset of the above mentioned functions to be used and viewed by anonymous connections to the system 100 while the full extent of the above mentioned functions are available for registered users only via a membership module. The membership module being a more customized dashboard that would include widgets 105 related to the SaaS applications or cloud computing services and user-defined code submission registered to the member.

The social networking function provides users of the system 100 both anonymous and registered aggregate performance data from all SaaS applications or cloud computing services being managed and monitored by the system 100. This data will be provided in order for potential SaaS or cloud computing customers of particular SaaS or cloud computing services or applications to see what current customers of the SaaS applications or cloud computing services are experiencing with respect, for example, SLAs, uptime, and performance. Using this data, potential SaaS customers will be able to easily search and discover SaaS or cloud computing providers that are meeting or exceeding real business SLAs in uptime and performance. This in combination with a user rating system provides the users of the social networking function a unique place to review, rate, and research SaaS providers and their service levels.

As seen in FIG. 5, the social network function starts at step 500 when a user requests a connection to the common connection and database framework of the system 100 via the public network 101. The system 100 displays the dashboard via the internet-based portal 103, and the social network function is initiated in step 501 by a selection of graphical element related to the social networking function within the dashboard 210. In step 502, a list of categories of services available to the user via the social networking function are displayed and the user is queried with regard to the selection of a category of interest. In step 503, it is determined if a selection of a category is complete, and if not, the user is queried again with regard to making a selection. In step 503, if the selection of the category is complete, the user is presented with a list of sub-categories of the selected category selected and queried as to a sub-category of interest to be selected. In step 504, the user selects a sub-category of interest.

In step 505, it is determined if the selection of a sub-category is complete, and if not, the user is queried again with regard to the selection of a subcategory. In step 505, if a selection of sub-category is complete, then in steps 506 and 507, the user is provided access to and the ability make a selection of the data available for the subcategory selected. As noted above, an example of the data available may include SaaS or cloud computing providers meeting or exceeding real business SLAs in uptime and performance. Additionally, the data may be related to a user rating system that provides the users of the social network a unique place to review, rate, and research SaaS providers and their service levels.

The social network function also offers the ability of a user to provide data regarding their use or experience with an SaaS application or cloud computing service. Accordingly, in steps 508, it is determined if the user wishes to store data related to the selected sub-category and, if so, in step 509 the data is stored. In step 508, if the user does not wish to store data related to the selected sub-category, then the process ends in step 511. However, in step 510, it is determined if the user wants to make another selection of a category of interest, and if so, another selection can be made, as in step 502. However, if no additional selection is to be made in step 510, then the process ends at step 511.

Figure 6:
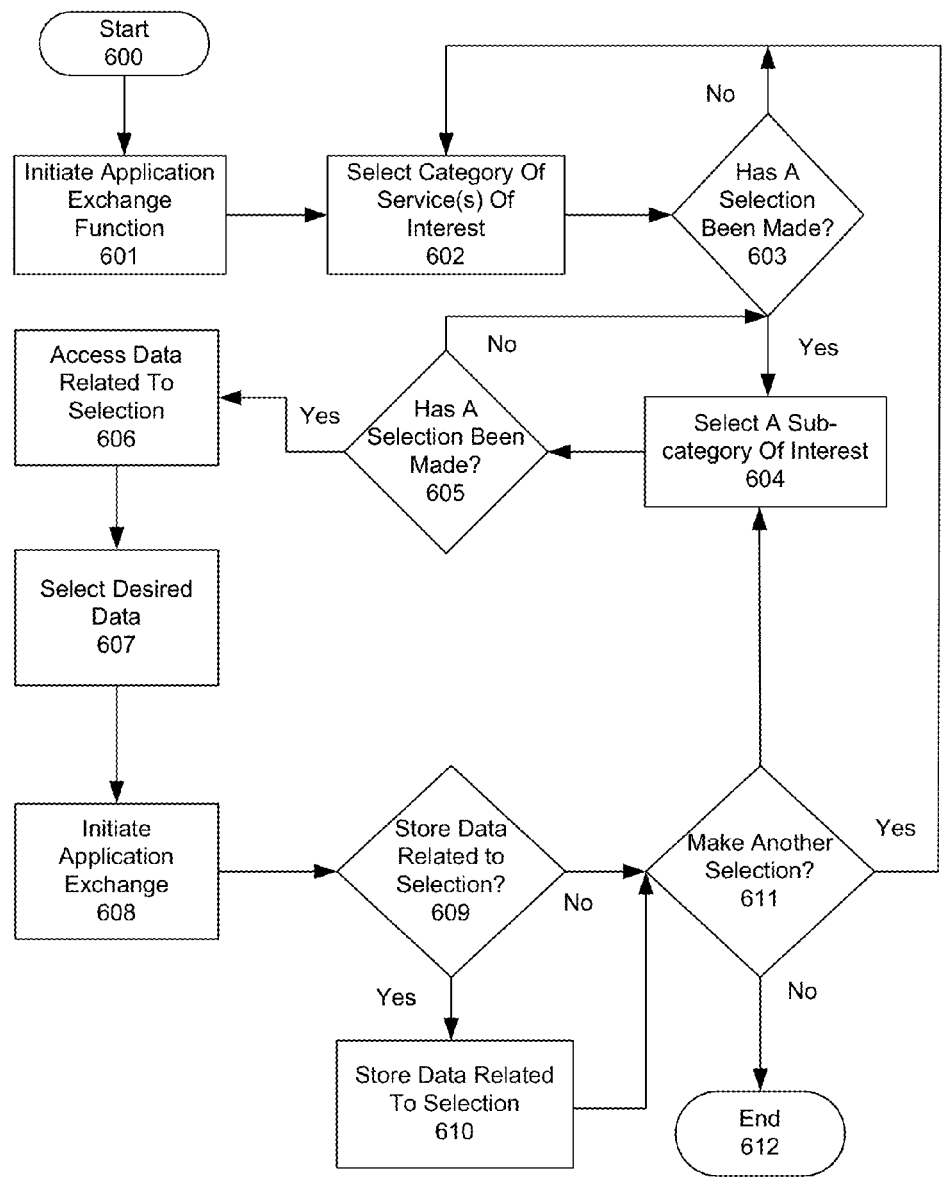
FIG. 6 illustrates a flowchart for performing the application exchange function related to the use of SaaS application or cloud computing service in accordance with an embodiment of the invention.

FIG. 6 illustrates a flowchart for performing the application exchange function related to the use of an SaaS application or cloud computing service in accordance with an embodiment of the invention.

The application exchange function of the system 100 allows external developers to utilize a public application software development kit to access and utilize databases and infrastructure to perform the primary functions of the system 100. The software development kit (SDK) contains all methods needed to interface with the system APIs. With the SDK format, developers are able to provide objects, attributes and operational data that will allow interaction with selected SaaS applications or cloud computing services. The user-defined code submissions are contributed to the system 100 via, for example, an interactive application storefront. Additionally, the application storefront allows registered users of the system 100 to select, register, unregister, and rate all the available user-defined code submissions.

As seen in FIG. 6, the application exchange function starts at step 600 when a user requests a connection to the common connection and database framework of the system 100 via the public network 101. The system 100 displays the dashboard via the internet-based portal 103, and the application exchange function is initiated in step 601 by a selection of graphical element related to the application exchange function within the dashboard 210. In step 602, a list of categories of services available is displayed and the user is queried with regard to the selection of a category. In step 603, it is determined if a selection of a category is complete, and if not, the user is queried again with regard to making a selection. In step 603, if the selection of the category is complete, the user is presented with a list of sub-categories of the selected category selected and queried as to a sub-category to be selected. In step 604, the user selects a sub-category via the dashboard 210.

In step 605, it is determined if the selection of a sub-category is complete, and if not, the user is queried again with regard to the selection of a subcategory. In step 605, if a selection of sub-category is complete, then in steps 606 and 607, the user is provided access to and the ability make a selection of the data available for the subcategory selected. As noted above, the data may relate to objects, attributes and operational data that will allow interaction with selected SaaS applications or cloud computing services. In step 608, the user can initiate the application exchange by, for example, storing the data that will allow interaction with selected SaaS applications or cloud computing services.

The application exchange function also offers the ability of a user to contribute data to the system 100, wherein the data may relate to objects, attributes and operational data that will allow interaction with selected SaaS applications or cloud computing services. Accordingly, in steps 609, it is determined if the user wishes to store data related to the selected sub-category and, if so, in step 610 the data is stored. In step 609, if the user does not wish to store data related to the selected sub-category, then it is determined if the user wants to make another selection of a category of interest n step 611. If the user wishes to make another selection, then another selection can be made as in step 602. However, if no additional selection is to be made, then the process ends at step 612.

Figure 7:
FIG. 7 and FIG. 8 illustrate examples of the textual and graphical representations of the information available via the social networking function.
Figure 8:
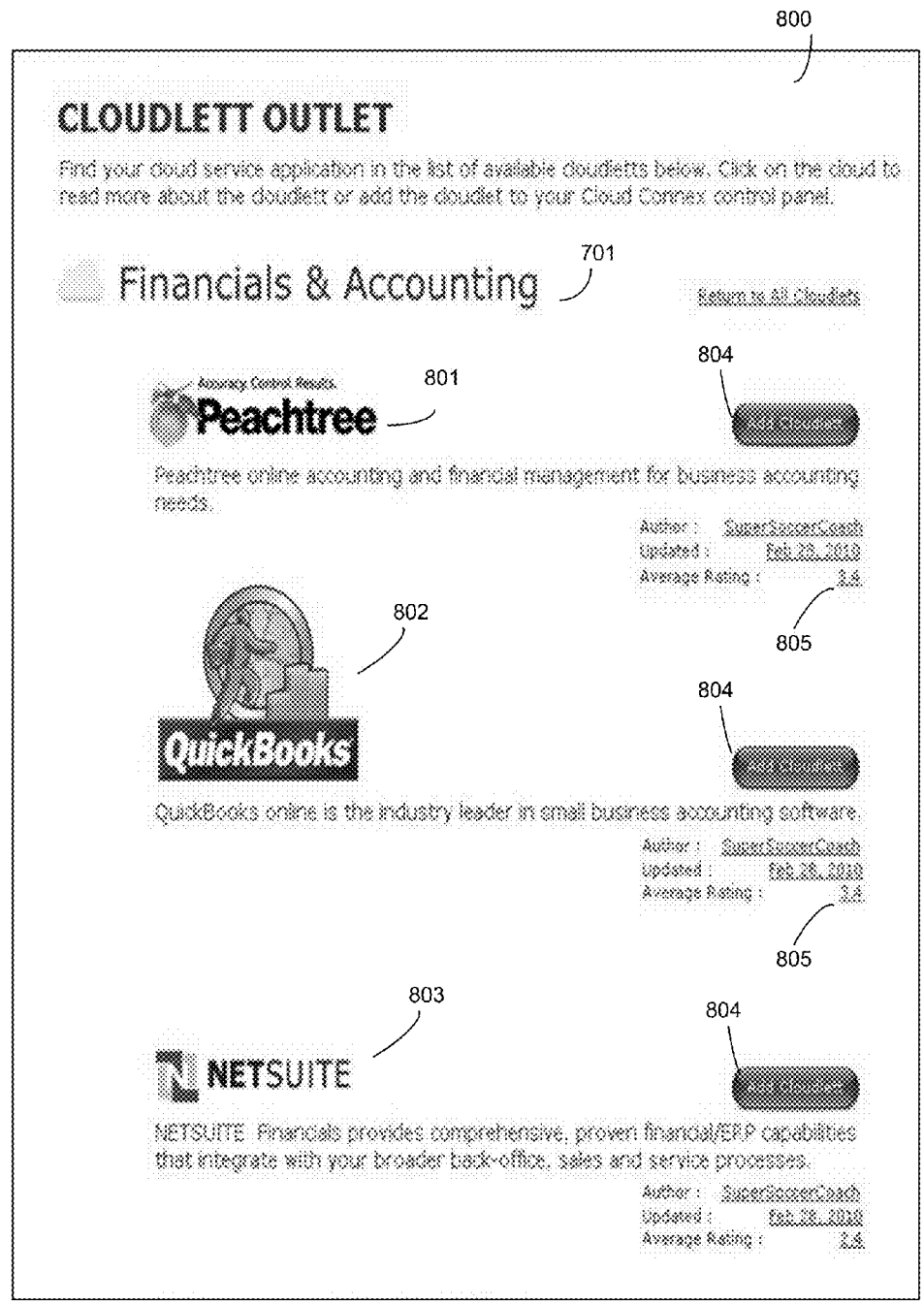

FIGS. 7 and 8 illustrate examples of the textual and graphical representations of the information available via the social networking function. As noted above in the discussion of FIG. 5, a user connected to the social networking function via the dashboard 210 is provided with a list of categories of services that are available to the user.

FIG. 7 is an exemplary representation of a list 700 of categories of services 701, 702, 703, 704, 705, 706, 707 available to the user through the social network function of the system 100. In this case, it is assumed that the category of interested selected by the user is "Financials & Accounting" 701. FIG. 8 illustrates the list 800 of sub-categories 801, 802, 803 of the "Financials & Accounting" 701. A user would reach the sub-categories 801, 802, 803 by making a selection of the category "Financials & Accounting" 701 show in FIG. 7. As seen in FIG. 8, the list 800 of sub-categories includes "Peachtree" 801, "QuickBooks" 802, and "NETSUITE" 803. Additionally, FIG. 8 includes rating information 805 for each of the sub-categories "Peachtree" 801, "QuickBooks" 802, and "NETSUITE" 803 listed. Based on a review of the data related to a sub-category, the user can register for a subcategory, which is related to an SaaS application or cloud computing service, by making a selection 804 to add the corresponding sub-category to the list of registered SaaS applications or cloud computing services available to the user.

Additionally, the secondary function offered through the system 100 is also very beneficial to the user of the application with respect to business compliance and governance. Operational and Security log information can be extracted from an SaaS application via the user-defined code submission and stored centrally within the applications logs database 109. The data contained within this database 109 can then be queried and reported in various formats. This data is also able to be sorted and filtered by user, date, time, application, event type, and severity type. By gathering and correlating all this data into a central repository the user of the application can create reports used for testing evidence for audits such as SOX, GLB, PCI, HIPAA, and other industry specific data and information security compliance regulations. Such data can also be used to produce activity reports for a single user or a group of users across all managed and monitored SaaS applications or cloud computing services.

Figure 9:
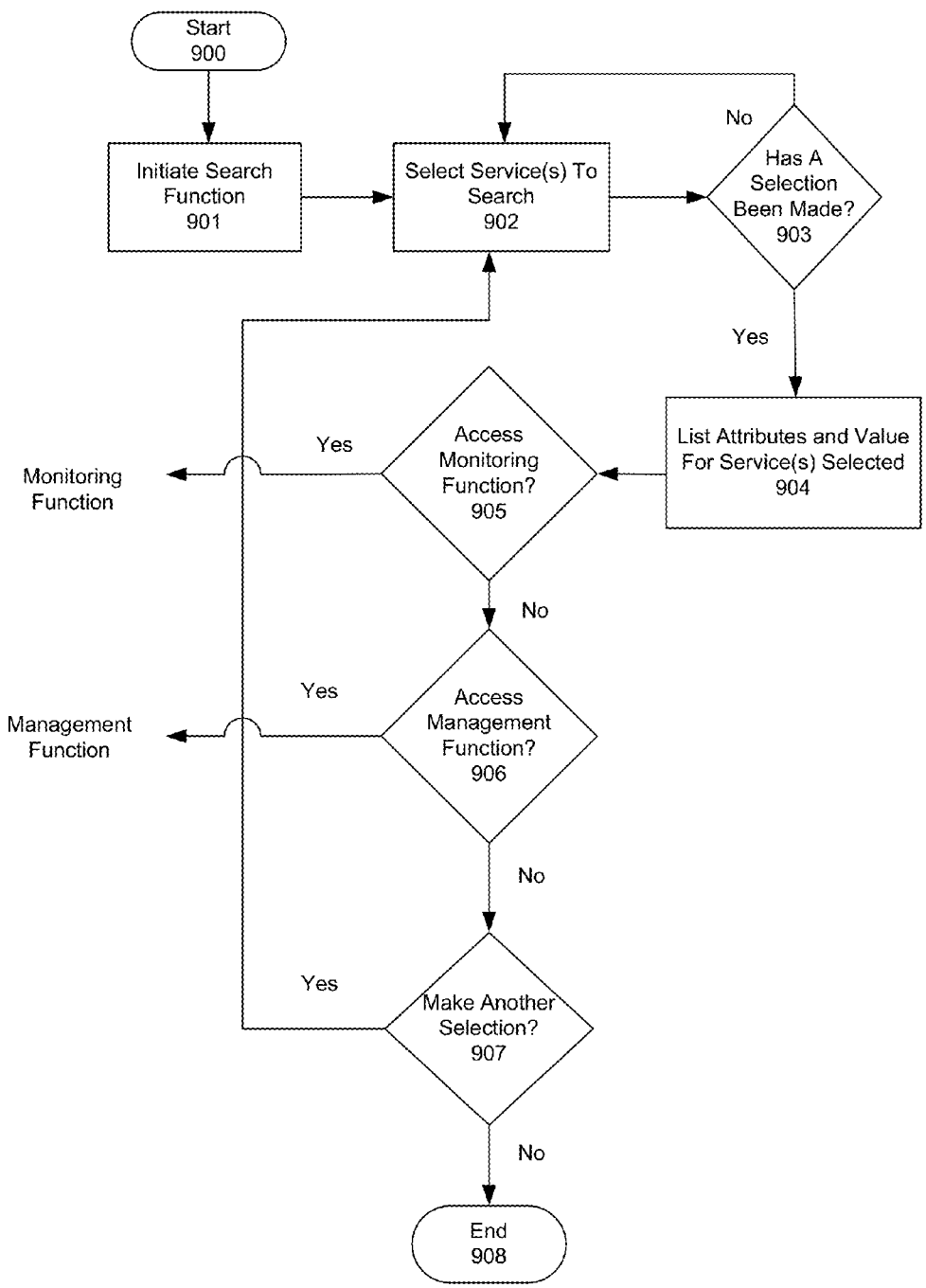
FIG. 9 illustrates a flowchart for performing a method of searching information related to the SaaS applications or cloud computing services in accordance with an embodiment of the invention.

FIG. 9 illustrates a flowchart for performing a method of searching information related to the SaaS applications or cloud computing services in accordance with an embodiment of the invention. As seen in FIG. 2, the dashboard 210 includes search option 212 for searching within the system 100 via the dashboard 210. As seen in FIG. 9, search function begins in step 900, when a user requests a connection to the common connection and database framework of the system 100 via the public network 101. The system 100 displays the dashboard 210 via the internet-based portal 103, and the search function initiated in step 901 by a selection of graphical element 212 related to the search function within the dashboard 210. A list of services available to the user to be searched via the social networking function is displayed and the user is queried with regard to the selection of the service to be searched.

In step 902, the user makes a selection of the service to be searched. In step 903, it is determined if a selection of a service is completed, and if not, the user is queried again with regard to making a selection. In step 903, if the selection of a service is completed, then in step 904 the user is presented with a list of objects and object attributes related to the service selected. In step 905, it is determined if the user would like to access the monitoring function of the system 100 with regard to the object or object attributes listed. The monitoring function available to the user is similar to that discussed with reference to FIG. 3 and therefore will not be repeated here.

In step 905, if it is determined that the user does not wish to access the monitoring function, then in step 906 it is determined if the user would like to access the managing function of the system 100 with regard to the object or object attributes listed. The managing function available to the user is similar to that discussed with reference to FIG. 4 and therefore will not be repeated here. In step 906, if it is determined that the user does not wish to access the managing function with regard to the objects and object attributes listed, then in step 907 it is determined if the user would like to select another service to be search, and if so, then another service is selected, as in step 902. In step 907, if it is determined that another service will not be selected, then in step 908 the process ends.

Figure 10:
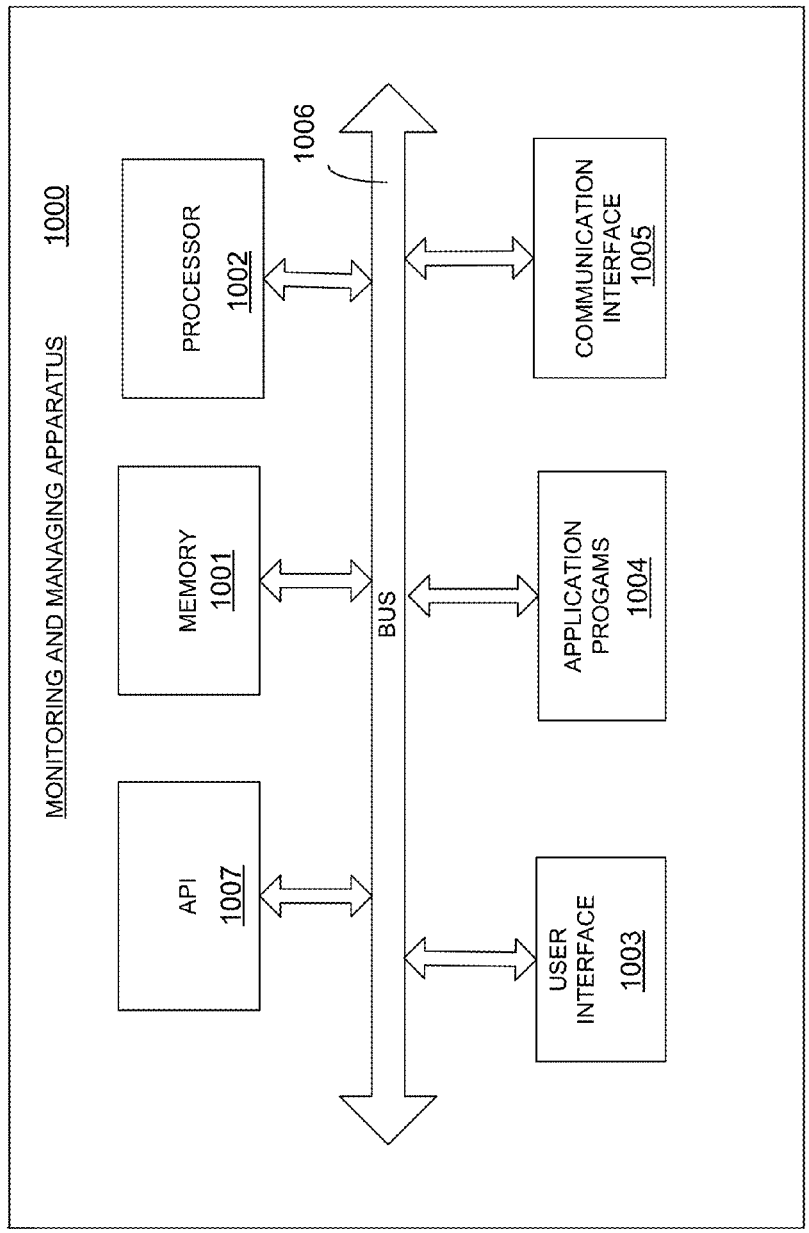
FIG. 10 illustrates a monitoring and managing apparatus in accordance with an embodiment of the present invention.

FIG. 10 illustrates an exemplary monitoring and managing apparatus in accordance with an embodiment of the present invention. In FIG. 10, the monitoring and managing apparatus 1000 includes a memory 1001, a processor 1002, user interface 1003, application programs 1004, communication interface 1005, bus 1006 and API 1007.

The memory 1001 can be non-transitory computer-readable storage medium used to store executable instructions, or computer program thereon. The memory 1001 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above. The computer program is also intended to include an algorithm made up of executable instructions stored in the memory 1001 that are executable by the processor 1002, which may be facilitated by one or more of the application programs 1004.

The user interface 1003 allows for interaction between a user and the monitoring and management apparatus 1000. The user interface 1003 includes the Internet-based (front end) portal 103, wherein the portal 103 includes the dashboard 210 that acts as a container for all other user interface elements or widgets 105 for initiated functions of the system 100. The communication interface 1005 provides for two-way data communications to and from the monitoring and management apparatus 1000.

The application programs 1004 may include, but are not limited to, an operating system or any special computer program that manages the relationship between application software and any suitable variety of hardware that helps to make-up a computer system or computing environment of the monitoring and management apparatus 1001. General communication between the components in monitoring and management apparatus 1001 is provided via the bus 1006.

Additionally, the monitoring, managing, social networking, connecting and searching functions as described with reference to FIGS. 3-9 can all be performed by the application programs 904 or by programs or algorithms that are stored, for example, in the memory 1001 of the monitoring and managing apparatus 1000 and executed by the processor 1002. The application programs 1004 also include the user-defined code submissions 112-115 that allows data communications via the dashboard of portal 103 and to the SaaS applications or cloud computing services 120-123 via the Internet 101. As noted with reference to FIG. 1, the user-defined code submissions 112-115 allows the monitoring and managing apparatus 1000 to push data to and pull data from the SaaS applications or cloud computing services 120-123 based on an activity initialed from the dashboard of the portal 103 or at periodic intervals. Additionally, the widgets 105 also contain links and or shortcuts to other functions available through the portable 103.

The communication interface 1005 may also include a digital subscriber line (DSL) card or modem, an integrated services digital network (ISDN) card, a cable modem, or a telephone modem to provide a data communication connection to a corresponding type of telephone line. As another example, communication interface 1005 may be a local area network (LAN) card (e.g., for Ethernet™ or an Asynchronous Transfer Model (ATM) network) to provide a data communication connection to a compatible LAN.

Further, the communication interface 1005 may also include peripheral interface devices, such as a Universal Serial Bus (USB) interface, a Personal Computer Memory Card International Association (PCMCIA) interface, and the like. The communication interface 1005 also allows the exchange of information across one or more wireless communication networks. Such networks may include cellular or short-range, such as IEEE 802.11 wireless local area networks (WLANS). And, the exchange of information may involve the transmission of radio frequency (RF) signals through an antenna (not shown). The communication interface 1005 also includes the data access layers as described with reference to FIG. 1 that allow data access between the monitoring and managing apparatus 1000 and the databases 107, 108 and 109, and between the user-defined code submissions and the SaaS applications or cloud computing services.

The APIs 1007 of the monitoring and managing apparatus include all the code, logic, functions and parameters for brokering and securing communications with the user-defined code submission 115-117 and the SaaS applications or cloud computing services 120-123, as described with reference to FIG. 1.

For easy of explanation, the internet-based portal 103, dashboard 210, user-defined code submissions 112-115, data access layers 106, 110, and API 111 described with reference to FIG. 1, are contained within the computer architecture of the monitoring and managing apparatus 1000 of FIG. 10. The above elements may be an application program 1004 or a program stored in the memory 1001 and executed by the processor 1002 for performing the functions described with reference to this figure as well as FIG. 1. That is, the monitoring and managing apparatus 1000 can be part of the system 100 described with reference to FIG. 1. Accordingly, the detailed operation of the above elements are the same as that already described with reference to FIG. 1 and thus will not be repeated here.

From the description provided herein, those skilled in the art are readily able to combine software created as described with the appropriate general purpose or special purpose computer hardware for carrying out the features of the invention.

Additionally, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

What is claimed is:

1. A method performed by a computer system, the method comprising:
receiving, with a transceiver of the computer system, a request to monitor attributes related to cloud computing services, wherein the request is received with use of a portal within a common connection and database framework;
generating, by the computer system, an internet-based interface that is configured to display, provide selections, and provide access to the attributes;
providing, by the computer system, an application exchange component or social networking component to share information related to the cloud computing services;
processing, by the computer system, a selection criteria for an object related to the cloud computing services within the internet-based interface to be monitored within the common connection and database framework;
wherein the selection criteria includes a selected item from a list of available items and a cloud computing service from a list of available cloud computing services related to the object;
wherein the selection criteria includes a type of report for reporting monitoring results; and
providing, by the computer system, a monitoring result for the selected item and the cloud computing service.

2. The method of claim 1 further comprising:
partitioning, by the computer system, of the attributes based on cloud computing services registered to a user or corporate entity.

3. The method of claim 1, wherein monitoring includes reading, extracting, analyzing, correlating, and reporting information related to the cloud computing services.

4. The method of claim 1, wherein the object includes users, groups, policies, mailboxes, and phones related to the cloud computing services.

5. The method of claim 1, wherein the list of available items includes users, groups, policies, mailboxes, and phones related to the cloud computing services.

6. The method of claim 1, wherein the application exchange includes the exchange of an application program interface to utilize the cloud computing services.

7. The method of claim 1 further comprising:
monitoring, by the computer system, ratings information related to the cloud computing service; and
wherein the ratings are presented in a graphical format along with text comments related to the ratings.

8. A computer system characterized in that:
a processor is configured to generate an internet-based interface to display, provide selections, and access attributes related to cloud computing services;
the computer system is configured to provide at least one data access layer to establish data communications between the cloud computing services to monitor and a plurality of databases, wherein the data communications includes to store and retrieve the attributes stored in the plurality of databases;
the computer system is configured to provide a push-pull data layer configured to push data to and pull data from the cloud computing services based on a command received via the internet-based interface;
the computer system is configured to provide a social networking component that allows sharing of information related to the cloud computing services by a connection to a common connection and database framework;
the computer system is configured to provide an application exchange component that allows sharing of information related to the cloud computing services by another connection to the common connection and database framework; and
wherein the cloud computing services to monitor are controllable within the internet-based interface with a single portal.

9. A computer system characterized in that:
a transceiver, of the computer system, is configured to receive a request to monitor attributes related to cloud computing services, wherein the request is received via a portal within a common connection and database framework;
a processor, of the computer system, is configured to generate an internet-based interface that is configured to display, provide selections, and provide access to the attributes;
the computer system is configured to provide an application exchange component or social networking component to share information related to the cloud computing services;
the computer system is configured to process a selection criteria for an object related to the cloud computing services within the internet-based interface to be monitored within the common connection and database framework;

wherein the selection criteria includes a selected item from a list of available items and a cloud computing service from a list of available cloud computing services related to the object;

wherein the selection criteria includes a type of report for reporting monitoring results; and providing, by the computer system, a monitoring result for the selected item and the cloud computing service.

10. The computer system of claim 9 further characterized in that:

the computer system is configured to partition the attributes based on cloud computing services registered to a user or corporate entity.

11. The computer system of claim 9, wherein monitoring includes reading, extracting, analyzing, correlating, and reporting information related to the cloud computing services.

12. The computer system of claim 9, wherein the object includes users, groups, policies, mailboxes, and phones related to the cloud computing services.

13. The computer system of claim 9, wherein the list of available items includes users, groups, policies, mailboxes, and phones related to the cloud computing services.

14. The computer system of claim 9, wherein the application exchange includes the exchange of an application program interface to utilize the cloud computing services.

15. The computer system of claim 9 further characterized in that:

the computer system is configured to monitor ratings information related to the cloud computing service; and wherein the ratings are presented in a graphical format along with text comments related to the ratings.

* * * * *